May 16, 1939.  A. H. LAMB  2,158,464
CONTROLLER
Filed March 28, 1936   4 Sheets-Sheet 3
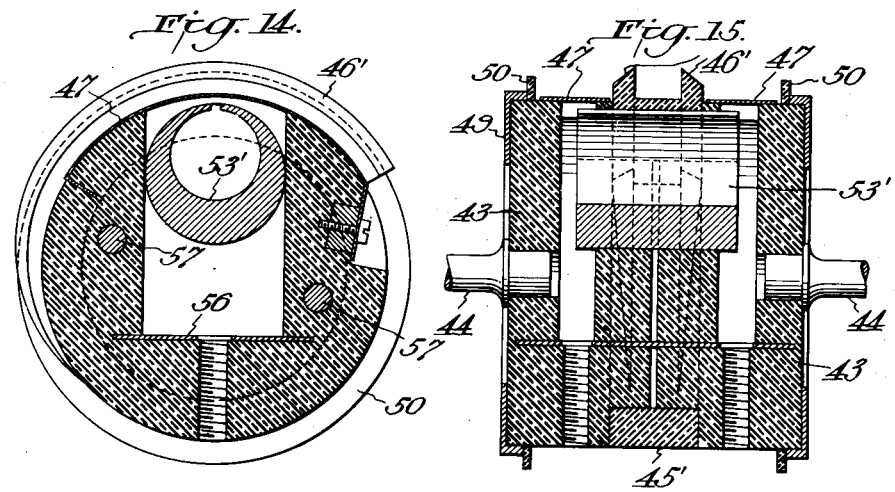
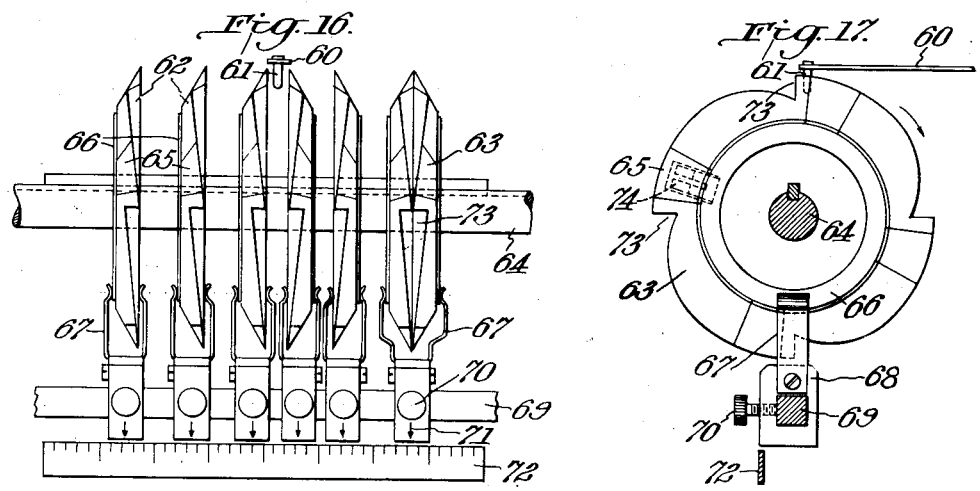
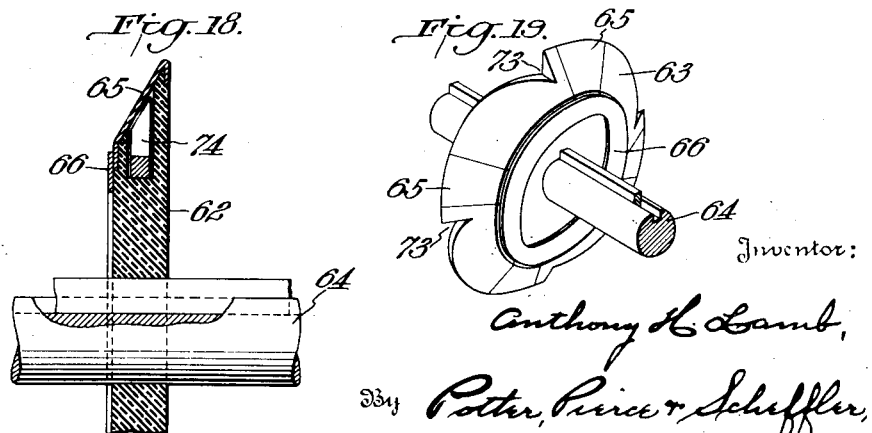
Inventor:
Anthony H. Lamb,
By Potter, Pierce & Scheffler
Attorneys.

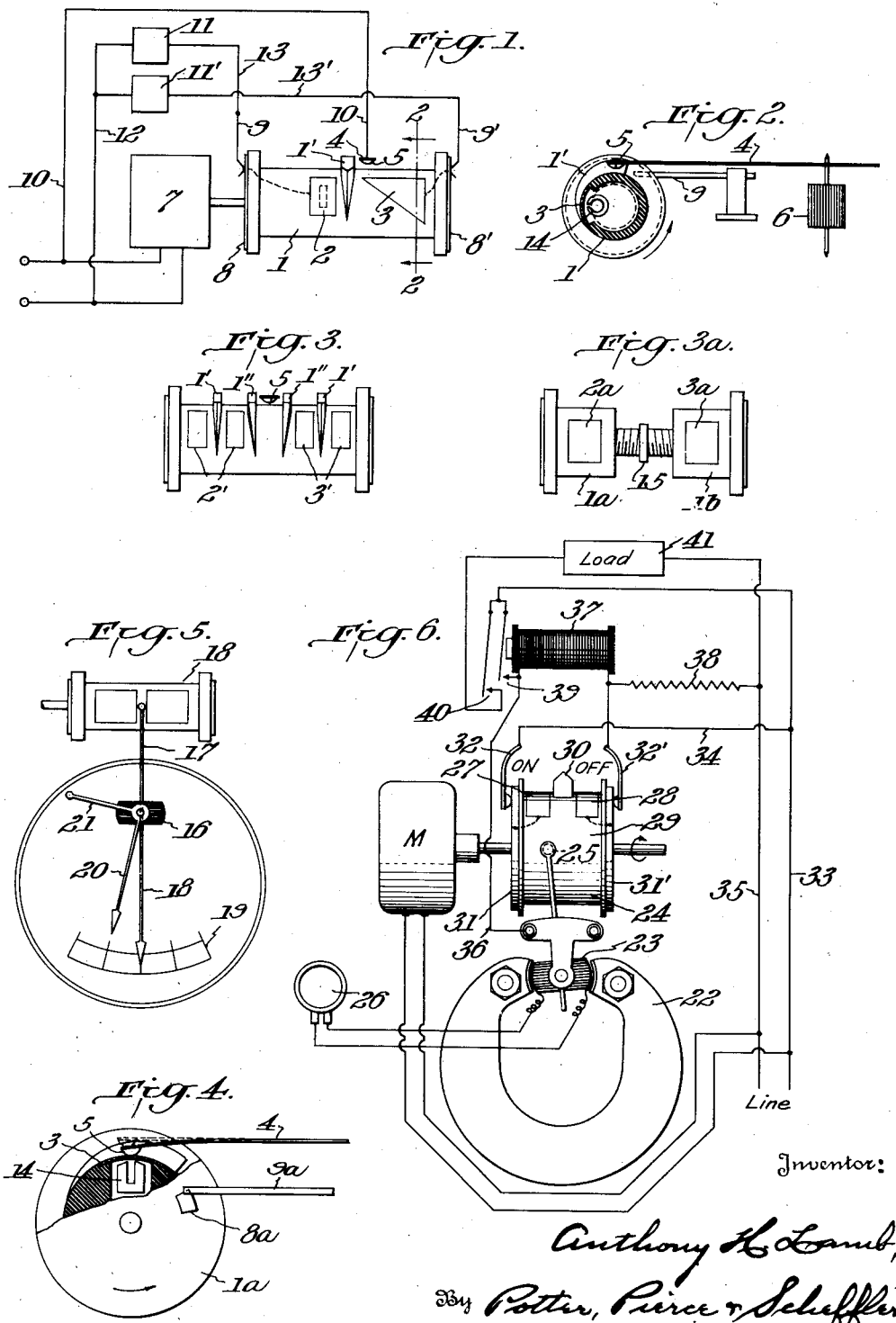

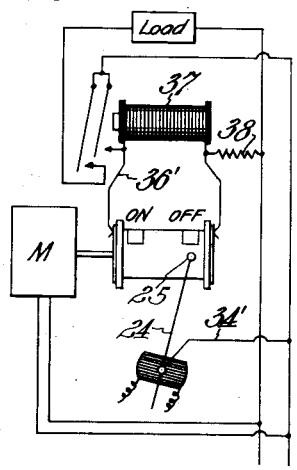
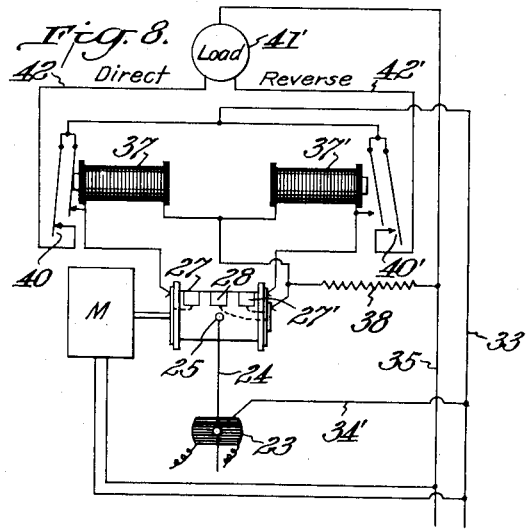
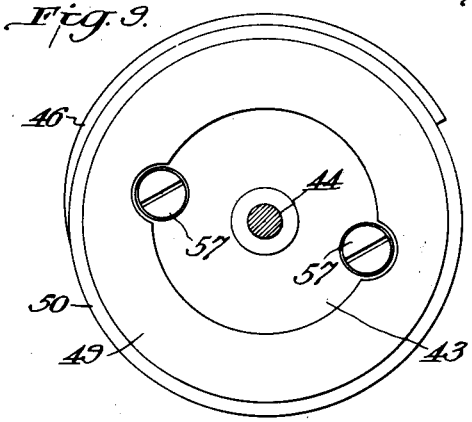
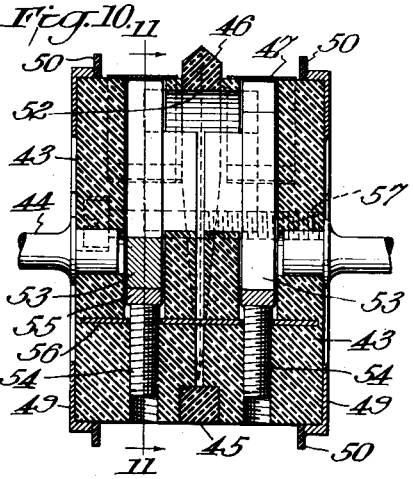
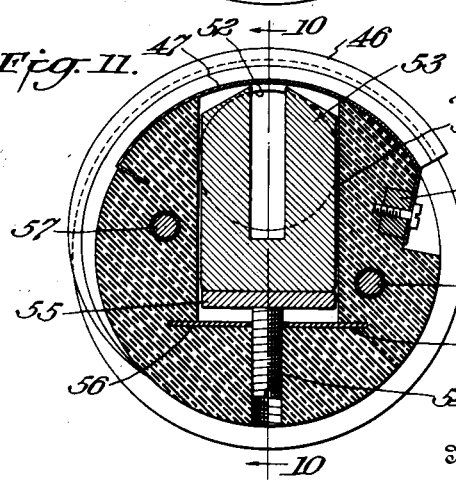
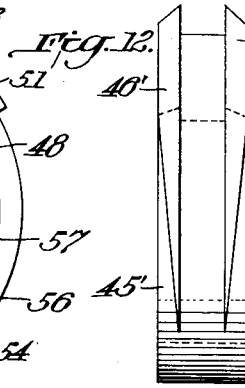
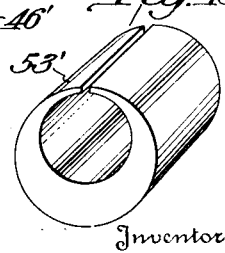

May 16, 1939.  A. H. LAMB  2,158,464
CONTROLLER
Filed March 28, 1936  4 Sheets-Sheet 4
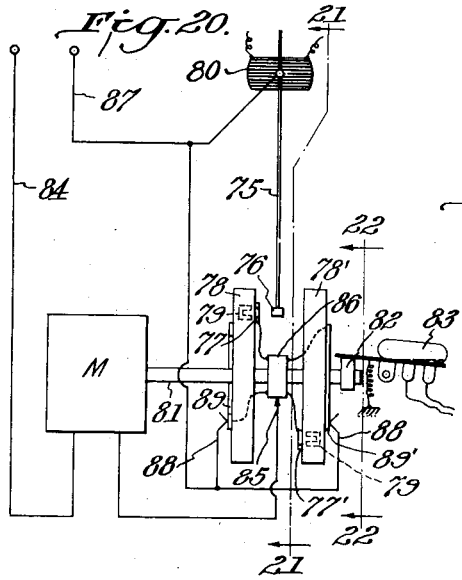
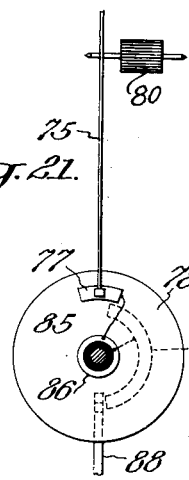
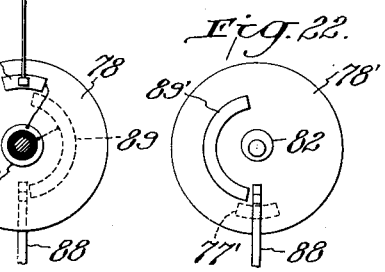
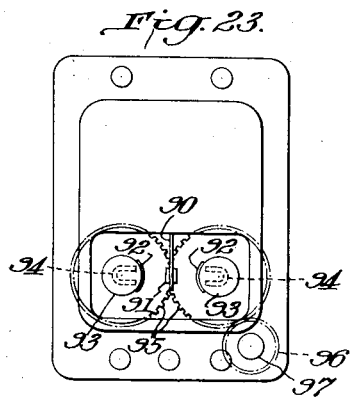
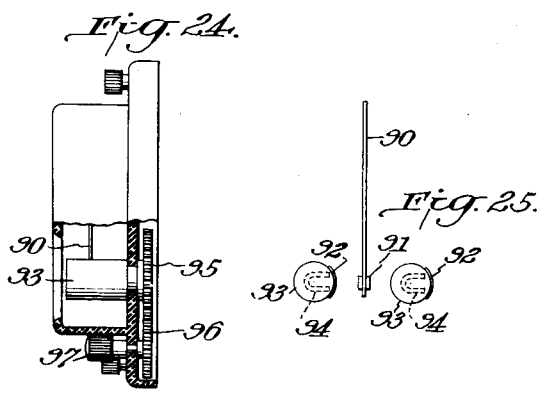
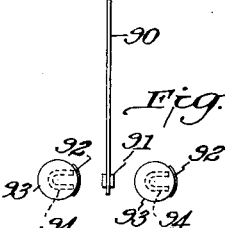
Inventor:
Anthony H. Lamb,
By Potter, Pierce & Scheffler
Attorneys Patented May 16, 1939

2,158,464

UNITED STATES PATENT OFFICE 2,158,464

CONTROLLER

Anthony H. Lamb, Elizabeth, N. J., assignor to Weston Electrical Instrument Corporation, Newark, N. J., a corporation of New Jersey Application March 28, 1936, Serial No. 71,531

16 Claims. (Cl. 200—56)

This invention relates to controllers and particularly to controllers which include a sensitive instrument movement for determining the opening and closing of electrical contacts in accordance with variations in the magnitude of the factor (such as illumination, temperature, pressure, humidity or the like) which affects the instrument movement.

One commonly employed type of commercial controller of high sensitivity includes a "dropbar" that is periodically depressed to engage the pointer of the measuring instrument. The pointer may be a contact arm which is forced down to engage with a contact to complete an electrical circuit or it may act merely as a physical element to determine the sense of operation of a mechanical linkage that is actuated by the drop bar to tilt a mercury switch tube. Various constructions have been proposed and many have gone into use but all are characterized by definite limitations as to the frequency of the control movements, i. e. the lifting and dropping of the bar. A movement of the bar in cycles of 7½ seconds has been used in some special instances, but it is more usual to drop the bar once each 30 or 15 seconds. Shorter periods of operation are not practical in view of the necessarily light construction of parts for high operating speeds, and the continuous hammering and vibration to which the parts would be subjected.

High operating speed may be had with the relay type of controller, i. e. one in which the pointer is a contact arm that is actuated directly by the moving system of the instrument to engage a contact. The more common forms of commercial controllers of the relay type are characterized by relatively low sensitivity as the springs required to close the contacts firmly and then release them cleanly necessarily limit the instrument sensitivity.

An object of the present invention is to provide a controller having the sensitivity of the moving system of an indicating instrument and having, when desired, a speed of operation comparable to the relay type of controller. An object is to provide a controller including electrical contact elements controlled by a moving system of high sensitivity and operable, at high speed if desired, to engage for a relatively short or long interval, an interval timed in some special relation to the amount of movement of the instrument pointer from a preselected position, or a continuous engagement of contacts selectively determined by the position of the pointer. A further object is to provide a controller of high sensitivity and having contact elements that engage with a wiping contact. More particularly, an object is to provide a controller in which the pointer of a measuring instrument is freely displaced, in accordance with the measured value of some factor, adjacent contacts carried by a rotating system; the pointer carrying a small rider of magnetic material that is drawn into firm engagement with the contacts by small permanent magnets positioned back of the contacts. An object is to provide different forms of controllers of the type last stated, in which the pointer and contacts are so positioned that the pointer is deflected out of its normal path of movement or, alternatively, in its path of movement, to close the contacts.

These and other objects and advantages of the invention will be apparent from the following specification when taken with the accompanying drawings in which:

Fig. 1 is a somewhat schematic front view of an embodiment of the invention, the wiring diagram being also shown;

Fig. 2 is a fragmentary side view, with parts in section, of the controller;

Figs. 3 and 3a are front views of other forms of rotary controller elements;

Fig. 4 is an end elevation, with parts in section, of a controller in which the local circuit is closed and opened by switch mechanism other than that formed by the instrument contacts;

Fig. 5 is a fragmentary plan view of a controller in which the instrument includes both a contact arm and a pointer movable over a graduated scale;

Fig. 6 is a plan view of another embodiment of the invention, and a diagram of one form of electrical circuit;

Fig. 7 is a diagram illustrating an alternative circuit for use with the controller of Fig. 6;

Fig. 8 is a diagrammatic view illustrating a control system employing another form of rotary contact assembly;

Fig. 9 is an enlarged end elevation of a contact assembly which has been operated in systems such as shown in Figs. 6 and 7;

Fig. 10 is a sectional view of the same as taken on line 10—10 of Fig. 11;

Fig. 11 is a sectional view taken on line 11—11 of Fig. 10;

Fig. 12 is a front elevation of a slitter rib such as may be used in Fig. 8;

Fig. 13 is a perspective view of another form of magnet for use in a rotary contact assembly;

Figs. 14 and 15 are sectional views, similar to Figs. 11 and 10, respectively, through a rotary controller assembly including the elements shown in Figs. 12 and 13;

Fig. 16 is a fragmentary front elevation of another form of rotary contact assembly;

Fig. 17 is a sectional view as seen from the right of Fig. 16;

Fig. 18 is a fragmentary sectional view showing the contact and its associated magnet;

Fig. 19 is a perspective view of one of the contact carrying elements;

Fig. 20 is a schematic view of another embodiment of the invention;

Figs. 21 and 22 are sectional views on lines 21—21 and 22—22, respectively, of Fig. 20;

Figs. 23 and 24 are, respectively, a plan view and side elevation, partly in section, of another embodiment; and Fig. 25 is a fragmentary plan view of a modification of the Fig. 23 construction.

In Figs. 1 and 2 of the drawings, the reference numeral 1 identifies a cylinder of insulating material which carries contact plates 2, 3 that are at opposite sides of a knife-edged lobe 1', the rib and the plates extending only partially around the cylinder. The arm or pointer 4 is pivotally mounted and carries a contact 5 of soft iron or other magnetic material. The arm 4 is a part of the moving system of a relatively sensitive measuring instrument of any desired type. As shown in Fig. 2, the arm 4 is carried by the moving coil 6 in an electrical measuring instrument but it is to be understood that the invention is not restricted to this type of instrument movement as the arm 4 and/or the contact 5 may be carried by the moving element of a bimetallic strip thermometer, a pressure gauge, a hygrostat or the like.

The cylinder is rotated, preferably by a small electric motor 7 of the type used in electric clocks, and the circuit connections to the contact plates 2, 3 are through the slip rings 8, 8' and brushes 9, 9', respectively, at opposite ends of the cylinder 1. The pointer or contact arm 4 is connected to one side of a source of current by a lead 10, and the devices 11, 11' that are to be energized have a common connection 12 to the other side of the current source and individual leads 13, 13' to the brushes 9, 9', respectively.

Attention is directed to the fact that the magnetic contact 5 does not, normally, engage the surface of the cylinder 1. The small permanent magnets 14 are mounted within the cylinder, just beneath the contact plates 2, 3 to draw the contact 5 into firm contact engagement with the plate which passes beneath the contact 5 as the contact assembly is rotated. The pointer 4 flexes to permit this movement of the contact 5, but the pointer lifts the contact free of the cylinder 1 as soon as the magnet 14 moves out of radial alinement with the contact. This arrangement provides a firm engagement of the contact surfaces, with wiping contact, but does not affect the sensitivity of the instrument movement. The lobe 1' insures a substantial displacement of the contact 5 towards one or the other of the contacts as its knife edge is in line with the normal position of contact 5 and serves to force the contact in the direction of movement initiated by the moving coil 6 and pointer 4.

The circumferential length of the contact plates may be short, long, tapered or continuous around the cylinder 1, to determine the relative length of the contact closure periods for one rotation of the contact assembly, and the frequency of the repetitions of control operations may be adjusted by varying the speed of rotation of the contact assembly. The invention is not restricted to any speed or range of speeds, but it has the decided advantage that high speed operation is possible, speeds of 60 or 120 revolutions per minute of the contact assembly not being at all unreasonable. The outer surfaces of the contact plates may be plated with gold or silver to reduce the contact resistance and, in some instances, these contact surfaces may be plated directly upon the magnet or magnets 14.

A plurality of contact surfaces 2', 3' may be provided on the cylinder at each side of the neutral position of the contact 5, as shown in Fig. 3, with lobes 1' between adjacent contacts of either group and a pair of lobes 1'' defining a neutral section which does not include a contact surface. The modified form of contact assembly shown in Fig. 3a includes two cylinder sections 1a, 1b, carrying contacts 2a, 3a, and a sleeve 15 having oppositely threaded ends for adjusting the longitudinal spacing of the cylinder sections. This arrangement permits an adjustment of the sensitivity of control that may be obtained with a measuring instrument of fixed sensitivity. The instrument contacts 3, 5 can be protected against arcing by substituting a short contact segment 8a, see Fig. 4, for the annular slip rings previously described; the location and length of the segment 8a being such that the local circuit is opened and closed at segment 8a and brush 9a during the period when contact 5 is held to the contact plate 3 by the magnet 14.

A continuous indication of the measured value of the factor may be had by providing the instrument movement 16, Fig. 5, with oppositely extending arms, one arm 17 carrying the magnetic contact for cooperation with the rotary contact assembly and the other arm 18 being a pointer movable adjacent a graduated scale 19. An index arm 20 having a manually adjustable handle 21 for setting the index to a desired value may be included in this form of controller.

The control system shown in Fig. 6 is a simple "on" and "off" control. The measuring instrument is of the electrical type and includes a permanent magnet 22 and a moving coil 23, the latter carrying the pointer 24 on which a magnetic contact 25 is mounted. The moving coil is connected across an electrical device, such as the photocell 26, having an output which varies with changes in some factor. The contact 25 has a free movement just above the top center line of a rotary contact assembly that is rotated continuously by the motor M; the assembly including contact surfaces 27, 28 which are longitudinally spaced on the cylinder 29 by the splitter rib 30. Slip rings 31, 31' are connected to contact surfaces 27, 28, and engaged by the brushes 32, 32', respectively. The brush 32 of the "on" contact surface 27 is connected to one wire 33 of a current supply line by a lead 34, and the contact 25 is connected to the other wire 35 through pointer 24 and the lead 36, the winding 37 of a relay, and the resistance 38. The "off" contact surface 28 is connected to the junction of the winding 37 and resistance 38, and the current supply wire 33 is connected to the movable contacts of the relay actuated switches 39 and 40. The other contact of switch 39 is connected to lead 36 to form a holding circuit for the relay winding, and the load or local circuit device 41 is connected between the second contact of switch 40 and the supply wire 35.

The "off" position of the several parts is illustrated in Fig. 6, but the pointer 24 is in position to reverse this condition upon the completion of approximately one turn of the rotor assembly. When the contact surface 27 is beneath the contact 25, the contact will be drawn to the surface 27 by a magnet (not shown) within the rotating cylinder, and the circuit to the relay winding will be completed from wire 33, through lead 34, brush 32, contacts 27, 25, lead 36, winding 37 and resistance 38 to the second line wire 35. The relay is thus energized to close switches 39, 40 and the load device 41 is connected directly across the wires 33, 35 so long as switch 39 of the holding circuit remains closed. A movement of the instrument to the right will result in the engagement of contact 25 with the "off" contact surface 28, thus short-circuiting the relay winding 37 through lead 36, pointer 24, contacts 25, 28, and brush 31'. The relay armature is released and switches 39 and 40 are opened.

In the alternative circuit arrangement shown in Fig. 7, the physical elements and the wiring are the same as shown in Fig. 6, except that the pointer 24 is connected to the supply wire 33 by a lead 34', and the brush 32 of the "on" contact is connected to the relay winding 37 by lead 36'. Other elements of the system are identified by the corresponding reference numerals of Fig. 6 but will not be described in detail. The controller operates to connect the supply wire 33 either to the outer terminal of the relay winding 37 or to the junction of that winding and resistance 38, depending upon the location of the pointer 34 in its "on" or "off" position, respectively. As distinguished from the Fig. 6 circuit, the wiring arrangement of Fig. 7 permits a current flow through the resistance 38 at each engagement of the contact 25 and the "off" contact 28 whether or not the relay circuit was already open. This repetition of current surges does not take place in the Fig. 6 circuit.

A control system for obtaining a "direct-off-reverse" control is shown in Fig. 8. The arrangement is similar to that of Fig. 7 but the "off" or neutral contact 28 is in line with the normal position of the pointer 24, and the "direct" and "reverse" contacts 27, 27' are at opposite sides of the contact 28. The circuit connections of the contacts 27, 28; the "direct" relay 37, and resistance 38 are as shown in Fig. 7, and the winding of a second or "reverse" relay 37' is similarly connected to the contact 27' and to the junction of relay 37 and resistance 38. The fixed contact 40 of the direct relay is connected to the load 41' by a lead 42, and the corresponding contact 40' of the reverse relay is connected to the load by lead 42'. The details of the load circuit are not important but this arrangement will be recognized as appropriate for the control of a reversing motor or for two electromagnetic switches, clutches or other control devices. When the parts stand in the positions shown in Fig. 8, the previous control action was effected by the engagement of contacts 25 and 27, since the relay 27 is energized and switch 40 of the "direct" control circuit is closed. The pointer has returned to neutral position for engagement with the "off" contact 28, and this will result in the short-circuiting of the relay 37 and the opening of the switch 40.

A rotary contact assembly such as indicated in Figs. 6 and 7 may be constructed as shown in Figs. 9, 10 and 11. A pair of similar disk members 43 of insulating material are mounted on stub shafts 44, one shaft being coupled to the driving motor and the other supported in a bearing. The adjacent or inner ends of the members 43 are of reduced diameter, and a ring 45 of insulating material is snugly fitted over these ends. A portion 46 of the ring projects beyond the cylindrical surface of the members 43 to form a knife-edged lobe. Contact shoes 47 in the form of thin silver plates are fixed to each element by inserting one end of the shoe in a narrow radial slot and bolting the other end to a brass block 48 which extends to the outer edge of the member 43 and is soldered to a flanged slip-ring 49, which may be of nickle-plated brass. Fibre insulating rings 50 are seated against the circumferential flanges of rings 49 to limit the displacement of the instrument pointer.

Each member 43 has a deep recess 51 extending radially inward from the cylindrical surface and, preferably a cylindrical opening 52 extending from the recess 51 through the inner face of the element. As shown in Figs. 10 and 11, small permanent magnets 53 are located in the recesses 51 of the separate elements and may be adjusted towards the contact shoes 47 by screws 54 that bear against plates 55 on which the magnets are seated. The screws and plates are of non-magnetic material, and a shield 56 of magnetic material, for example of the material known as "Permalloy" is positioned between the central portions of the magnets and the adjacent surface of the rotor elements 43. The parts are retained in assembled position by brass screws 57 which extend through one element 43 and ring 45, to threaded sockets in the other element.

The rotary contact assembly is shown on an enlarged scale in these views and the magnets, being of small size, are preferably formed of a "cobalt" steel, for example a 35% cobalt steel. As noted above, the magnets may be adjusted towards the contact shoes by the screws 54, and the magnetic attraction to the shield plate 56 will move the magnets in the opposite direction when the screws are backed off.

In place of a ring 45 having a single lobe 46, the ring 45' with two lobes 46', Fig. 12, may be substituted in the assembly when the control system permits a small range of movement of the instrument pointer before a control action is required. The cylindrical bores 52 are not essential when separate magnets 53 are used for the contact plates, but they provide a mounting for a single cylindrical magnet 53', Fig. 13, which will extend beneath both contact plates.

The form of rotary contact assembly shown in Figs. 14 and 15 includes the double lobed ring 45' and a cylindrical magnet 53', but other parts of the assembly may be the same as shown in Figs. 9 to 11, and are identified by the corresponding reference numerals of those views.

A type of construction which permits a ready adjustment of the critical contact values, and which provides good contact pressures with smaller magnets is shown in Figs. 16 to 19, inclusive. The contact arm 60 of the instrument movement carries a magnetic rider 61 which is drawn laterally, i. e., in the path of normal travel of the contact arm and rider, by magnetic attraction. One or more disks 62, 63, of insulating material, are slidably mounted on and keyed to a shaft 64 that is rotated by an appropriate motor mechanism, not shown, and the contact plates 65 are arranged at the approximately radial but preferably beveled edge portions of the disks. Contact rings 66 at one side of the disks 62, or at each side of the double edged disks 63, are engaged by spring brushes 67 in the form of yokes carried by insulating blocks 68 that are slidable along a rod 69 and may be clamped thereto by set screws 70 to position the contact disks. The blocks 70 carry or have indexes 71 marked thereon to cooperate with a graduated scale 72 that facilitates the setting of the contact disks to the desired positions. The several disks are cam shaped, i. e. are deeply notched, as at 73 just beyond the contact plates 65 as viewed in the direction of rotation, to provide clearance spaces for the free movement of the magnetic rider contact 61. The beveled edge portions of the disks and notches thus form knife edge lobes for guiding the rider 61 to the appropriate contact plate where the small magnets 74 behind the plates insure a good electrical contact. One or more notched portions and contact plates may be provided on each disk according to the desired time interval between control actions and the speed of rotation of the disks. Four cam shaped lobes and contact plates are illustrated but a greater or less number may be used.

According to a further embodiment of the invention, as shown in Figs. 20 to 22, the contact plates are not rotated continuously but are moved only when the contact arm of the measuring instrument engages one of the cooperating contacts. The contact arm 75 carries a magnetic rider 76 that is strongly attracted to segmental contact strips 77, 77' on disks 78, 78' by magnets 79 when the moving system 80 of the instrument displaces the contact arm into proximity to the contact strips. The disks are mounted on a shaft 81 which carries a cam 82 for tilting a mercury switch 83, the shaft being driven by a motor M. One terminal of the motor is connected directly to a current supply lead 84, and the other to a brush 85 which bears upon a contact ring 86 on shaft 81, the contact segments 77, 77' being connected to the contact ring. The other current supply lead 87 is connected to the contact arm 75 and to brushes 88 that engage segmental contacts 89, 89' on the disks 78, 78', respectively. These segmental contacts extend over something less than 180°, are connected to contact ring 86, and serve as holding contacts to energize the motor M for rotation of the shaft 81 through 180° after the motor supply circuit is completed by the engagement of the rider 76 with contact 77 or 77'. Contact strips 77 and 77', also segmental contacts are diametrically opposed and therefore the motor can be energized for one complete rotation of the shaft 81 only by a successive engagement of the contact arm first with one and then with the other of the contact segments 77, 77'.

Another type of rotary controller is shown in Figs. 23 to 25. The contact arm 90 has a magnetic rider 91 which is movable between contact plates 92 carried by small rotatably mounted cylinders 93 within which small permanent magnets 94 are mounted. The cylinders have meshing gears 95 that may be rotated by a gear 96 which may be actuated manually by a knob 97 to reset the control device upon a closure of the contacts. Both contact plates 92 are simultaneously presented towards the contact arm 90 in the control instrument shown in Fig. 23, but the contact plates may be mounted as shown in Fig. 25 when an alternate high and low control action is desired.

The several described embodiments of the invention indicate the wide latitude in the construction and arrangement of the several parts of the rotary controller devices and it is to be understood that many other variations fall within the spirit of my invention as set forth in the following claims.

I claim:

1. A controller for electric circuits and of the type including a moving system for displacing a contact in accordance with the measured value of a factor, and a contact element cooperating with said contact, characterized by the fact that said contact is of magnetic material, and said contact element is mounted on a rotatable support which carries a permanent magnet to provide a firm engagement of said contact and contact element when the same are moved into proximity by said moving system.

2. A controller as claimed in claim 1, wherein said rotary support is a cylinder of insulating material carrying a plurality of contact elements.

3. A controller as claimed in claim 1, wherein said rotary support comprises a plurality of axially spaced disks of insulating material each carrying at least one contact element on a side face thereof.

4. A controller for electric circuits comprising an electrical measuring instrument having a moving system including a contact arm carrying a contact of magnetic material, and a contact assembly; said assembly comprising a support of insulating material, magnetic contact means on said support for cooperation with the contact of said measuring instrument, a rotatable shaft carrying said support of insulating material, and means for rotating said shaft to separate said magnetic contact means from said contact of magnetic material.

5. A controller as claimed in claim 4, wherein a portion of said support is of substantially cylindrical form, and said contact means includes a contact plate at the surface of said cylindrical portion, and magnetic means within the cylindrical portion adjacent the contact plate.

6. A controller as claimed in claim 4, wherein said support has a cylindrical portion; and said contact means includes a plurality of contact plates at the surface of said cylindrical portion, and magnetic means within the cylindrical portion adjacent the several contact plates.

7. A controller for electrical circuits comprising a measuring system including a movable element carrying a contact of magnetic material, and a rotatable contact assembly cooperating with said contact; said assembly including a plurality of coaxial disks, a contact surface on each disk for engagement by said contact, and a permanent magnet adjacent each contact surface for attracting said contact of magnetic material.

8. A controller as claimed in claim 7, wherein there are more than two disks and said contact surfaces are arranged approximately radially upon the respective disks, certain of said disks having notched edges through which said contact may pass to permit the movable element to move to opposite sides of the notched disks.

9. A controller for electrical circuits and of the type including a moving system having a contact of magnetic material, one or more contact elements adapted to be engaged by said magnetic contact, and magnetic means for attracting said magnetic contact to a contact element when the latter is moved into proximity to the contact element by said moving system, characterized by the fact that said contact element or elements are mounted on a rotatable contact assembly, motor means is provided for rotating said contact assembly, and said moving system displaces said magnetic contact along a path intersecting the path of rotary movement of said contact element or elements.

10. A controller for electrical circuits comprising an instrument movement having fixed thereto a pointer carrying a magnetic contact, a rotary assembly including one or more electrical contact elements, motor means for rotating said assembly, said magnetic contact having a path of movement intersecting the path of rotary movement of said contact element or elements, and magnet means on said assembly at the inner side of the contact element or elements for drawing the magnetic contact of said pointer to the associated contact element when the said pointer has moved to position the magnetic contact adjacent that contact element.

11. A controller as claimed in claim 10, wherein said instrument movement is the moving coil of an electrical measuring instrument.

12. A controller as claimed in claim 10, wherein said rotary assembly includes a plurality of insulating disks having approximately radial edge portions lying in the path of movement of said magnetic contact of the pointer, the contact elements being positioned on said radial edge portions of the insulating disks.

13. A controller as claimed in claim 10, wherein said rotary assembly includes a plurality of insulating disks having approximately radial edge portions lying in the path of movement of said magnetic contact of the pointer and other edge portions of smaller diameter to permit free movement of the pointer and its magnetic contact, the contact elements being positioned on said radial edge portions of the insulating disks.

14. In a rotary controller, the combination with an instrument movement including a contact arm having a contact of magnetic material, of a plurality of rotatable disks of insulating material each carrying a contact for cooperation with said contact arm, and magnetic means for attracting said magnetic contact to said contacts, said contacts being mounted on said disks in the path of movement of said magnetic contact and each disk having a portion of reduced diameter to permit free movement of said magnetic material contact.

15. A rotary controller as claimed in claim 14, wherein each disk has a contact ring at one side thereof electrically connected to the contact of said disk, in combination with a yoke-shaped brush engaging said contact ring and the opposite side of the disk, means supporting said brush for adjustment, and means for fixing the brush in desired adjustment with respect to said supporting means.

16. A rotary controller as claimed in claim 14, in combination with a motor for rotating said disks, said contacts being segmental contacts diametrically arranged on the said disks, and means operative upon an engagement of said magnetic material contact with either of said disk contacts for energizing said motor to complete a 180° movement of said disks.

ANTHONY H. LAMB.